United States Patent

[11] 3,621,973

[72] Inventors Lloyd Carlson;
William E. Herd, both of Vancouver, Wash.
[21] Appl. No. 859,031
[22] Filed Sept. 18, 1969
[45] Patented Nov. 23, 1971
[73] Assignee Columbia Machine, Inc.
Vancouver, Wash.

[54] LOAD-HANDLING APPARATUS
26 Claims, 8 Drawing Figs.

[52] U.S. Cl. ................................................. 198/29
[51] Int. Cl. .................................................... B65g 47/22
[50] Field of Search ......................................... 198/37, 29, 34, 33, 27; 141/170

[56] References Cited
UNITED STATES PATENTS
1,416,345 5/1922 Gosselin ...................... 141/170 X 2,986,262 5/1961 Powers ........................ 198/29
3,173,554 3/1965 Ebbert ......................... 198/27 X Primary Examiner—Richard E. Aegerter
Assistant Examiner—H. S. Lane
Attorney—Kolisch & Hartwell ABSTRACT: Load-handling apparatus including a conveyor for transporting a load along a substantially horizontal path, and a power-operated shifter for shifting a load laterally on the conveyor. The conveyor includes plural spaced-apart power-driven rollers, and the shifter comprises plural spaced-apart rails which are movable upwardly between the spaces between such rollers and laterally of the path mentioned. Positioned adjacent a side of the conveyor is an upright plate against which a load may be shifted. The shifter also is reversible to accommodate shifting a load away from the upright plate. Control circuitry is provided which inhibits operation of the rollers in the conveyor during operation of the shifter.

Lloyd Carlson
William E. Herd
INVENTORS
BY Kolisch & Hartwell
Attys.

Lloyd Carlson
William E. Herd
INVENTORS
BY
Kolisch & Hartwell
Attys.

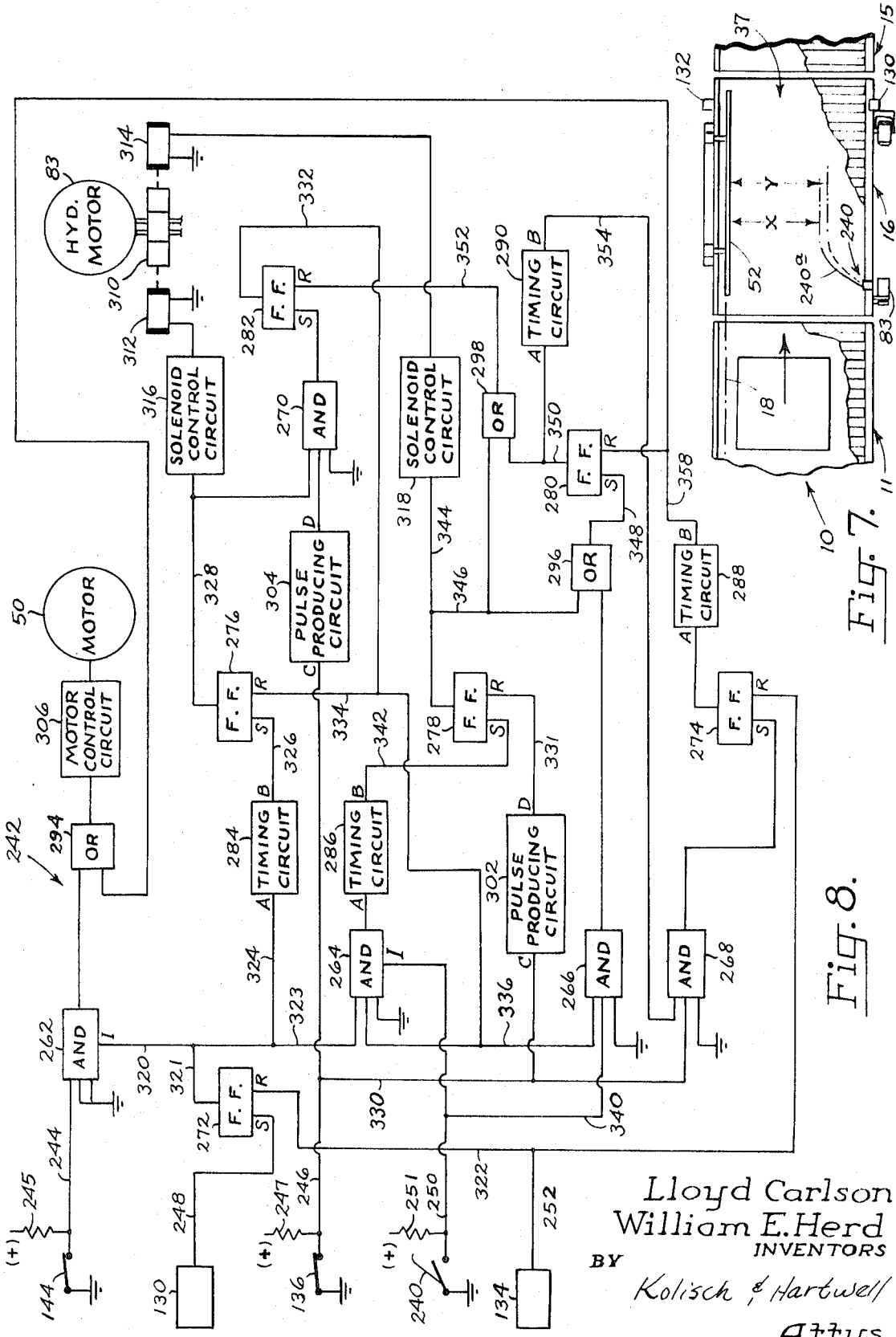

LOAD-HANDLING APPARATUS

This invention pertains to load-handling apparatus including a conveyor and apparatus for adjusting the lateral position of a load on the conveyor.

In a load-handling operation where loads are transported along a conveyor, it is often desirable to reposition a load laterally on the conveyor. This might be required, for example, where a load must be positioned within a certain zone laterally on the conveyor in order to be delivered properly at the offbearing end of the conveyor. Where, as is sometimes the case, a load comprises multiple closely grouped packages, arranged in one or more layers, it is important that such a repositioning operation be performed with minimal separation of packages in the load.

A general object of the present invention, therefore, is to provide novel load-handling apparatus including a conveyor and shifting means for adjusting the lateral position on the conveyor of a load carried thereby, which takes the above considerations into account in a practical and satisfactory manner.

More specifically, an object of the invention is to provide such apparatus wherein the lateral position of a load on the conveyor is readily and properly adjusted and separation of packages in a multiple-package load during such an adjustment is inhibited.

According to a preferred embodiment of the invention, the conveyor comprises multiple power-driven spaced-apart rollers, and the shifting means comprises plural spaced-apart rails which are movable upwardly through the spaces between the rollers, and laterally of the path along which the conveyor transports a load. The shifting means is operable to shift the load laterally against an upright plate adjacent one side of the conveyor which cooperates in positioning the load. Control means operatively connected to the conveyor and shifting means operates to stop the conveyor during movement of the rails in the shifting means. With this construction and operation, movement of a load along the path defined by the conveyor is halted before lateral shifting occurs. As a consequence, any tendency for packages in a multiple-package load to separate is minimized.

Yet another object is to provide apparatus of the type generally described where the shifting means is reversible and accommodates shifting of a load laterally away from the upright plate. Such a capability is desirable to promote proper positioning of a relatively narrow load, whereby the same may be positioned more nearly centrally relative to opposite sides of the conveyor.

These and other objects and advantages will become more fully apparent as the following description is read in conjunction with the drawings, wherein:

FIG. 7 is a simplified top plan view illustrating a modified form of load-handling apparatus as contemplated herein; and FIG. 8 is a simplified schematic diagram, partly in block form, illustrating control circuitry employed in the load-handling apparatus of FIG. 7.

Figure 1:
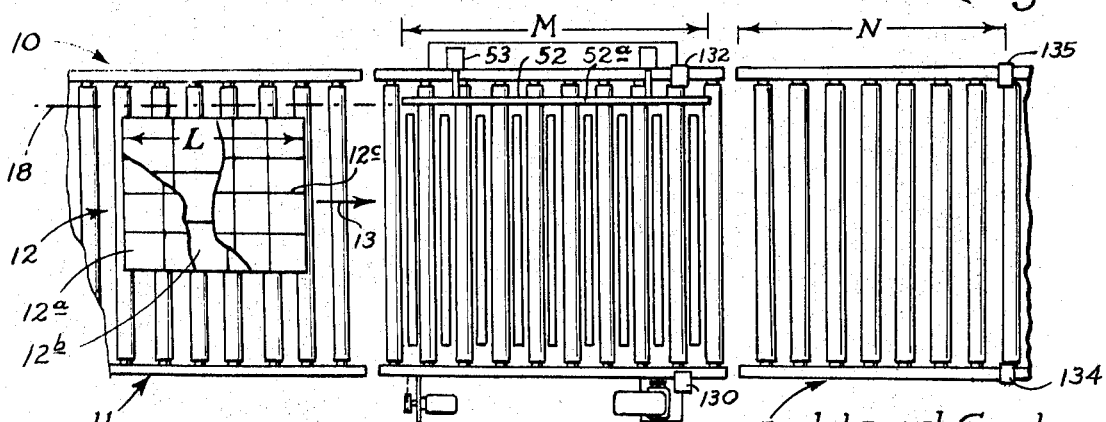
FIG. 1 is a simplified top plan view of a portion of a conveyor system including load-handling apparatus as contemplated by the invention.

Referring to the drawings, and first more specifically to FIG. 1, indicated generally at 10 is a portion of a load-handling system including apparatus 16 constructed according to the invention. Apparatus 16 is interposed between a pair of power-driven roller conveyors 11, 15, which are disposed upstream and downstream, respectively, of the apparatus. Conveyors 11, 15 and apparatus 16 are disposed with their longitudinal centerlines aligned along a substantially horizontal plane. With such alignment, a load, such as that indicated at 12, may be transferred from conveyor 11 to apparatus 16, and from the latter to conveyor 15, while traveling generally along a horizontal path in the direction of arrow 13.

The particular load which is illustrated in FIG. 1 (on conveyor 11) is formed of multiple packages stacked in layers, such as layers 12a, 12b, 12c. Load 12 has a length L measured along a line paralleling the axis of conveyor 11. Length L is about the maximum length of a load intended to be handled in the system. The width of load 12 indicated in FIG. 1 is about the maximum width of a load intended to be handled.

It will be noted that with load 12 in the position shown on conveyor 11 in FIG. 1, the top side of the load in the figure substantially parallels and is spaced below a datum line 18 which parallels the axis of the conveyor. Such spacing results from load 12 having been placed (in any suitable manner) a certain distance from line 18 adjacent the infeed end of conveyor 11.

Figure 2:
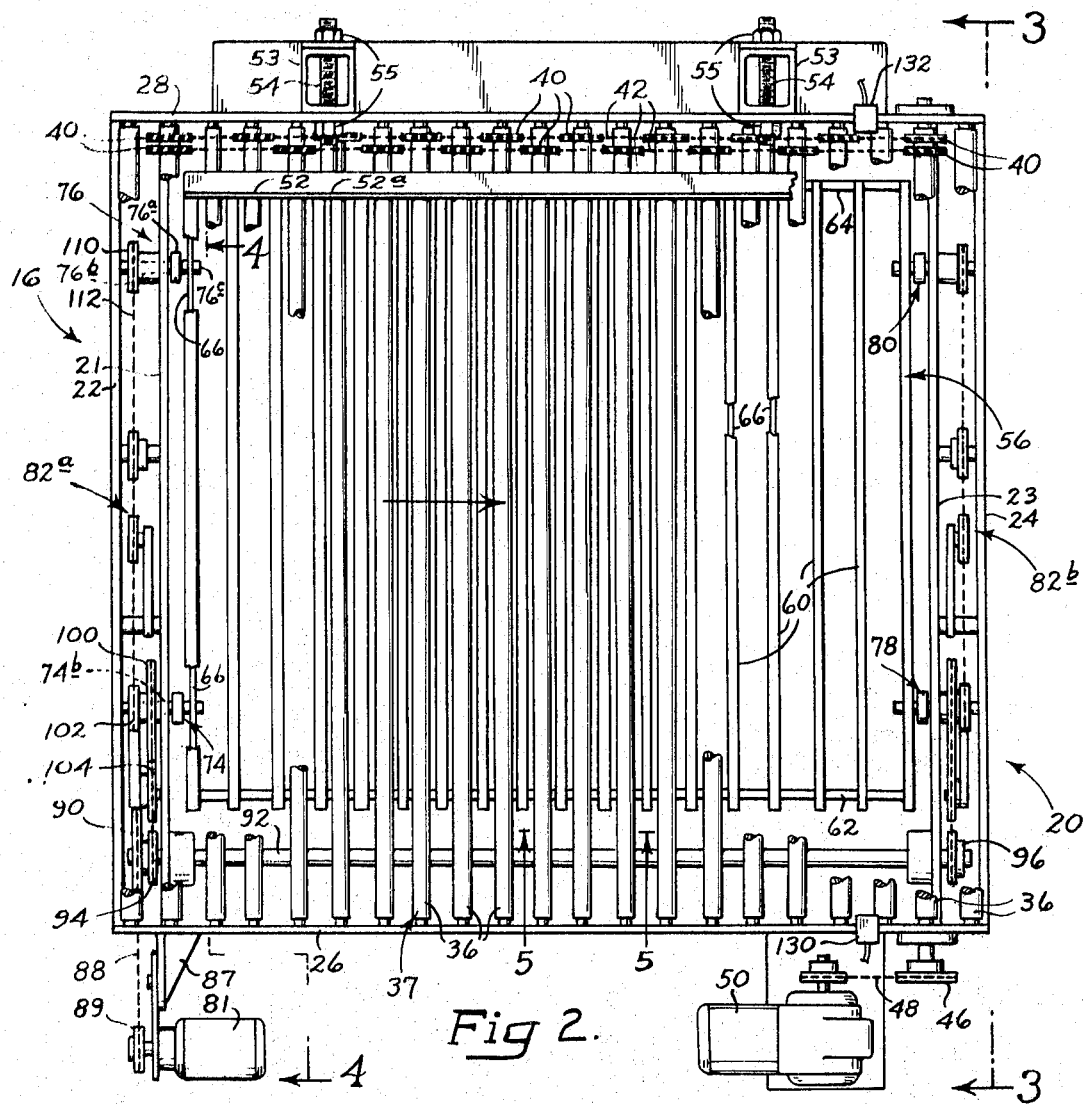
FIG. 2 is a view, on a larger scale than FIG. 1, illustrating in greater detail the load-handling apparatus of FIG. 1.
Figure 3:
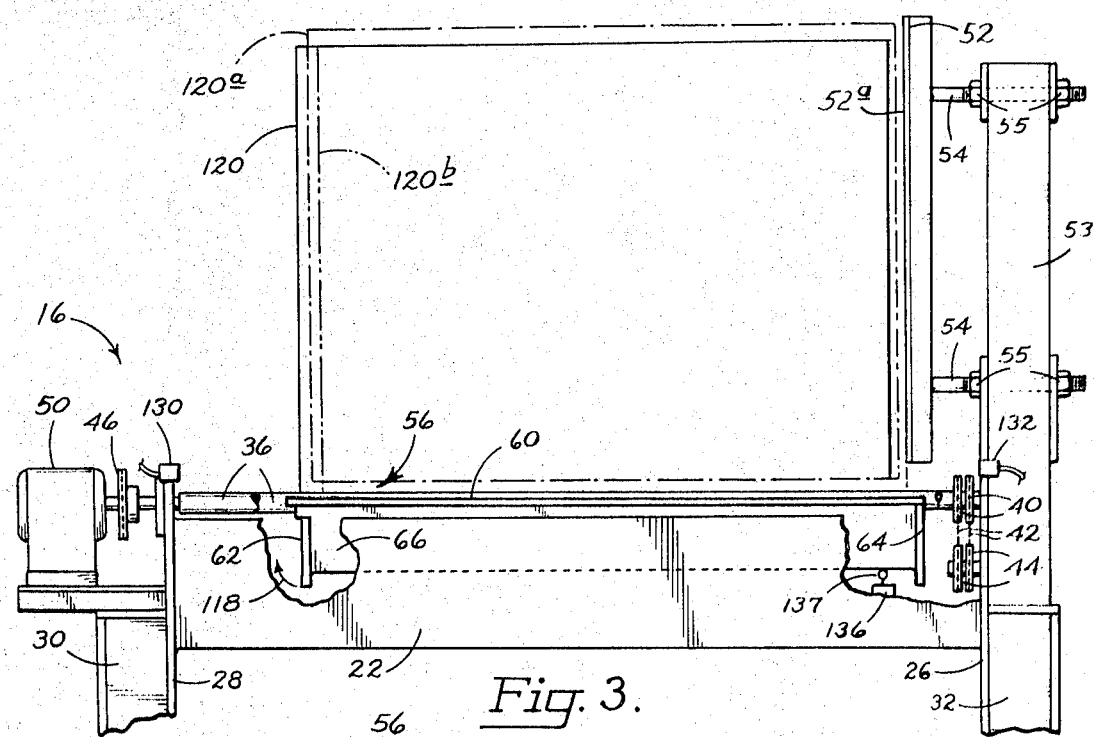
FIG. 3 is an end elevation taken generally along the line 3—3 in FIG. 2.

Referring now to FIGS. 2 and 3, load-handling apparatus 16 is shown in greater detail. Apparatus 16 includes a frame indicated generally at 20, having substantially parallel and laterally spaced upright end plates 21, 22 at one end of the frame and 23, 24 at the other end of the frame. Substantially parallel, laterally spaced upright sideplates 26, 28 join at their ends to opposite sets of ends of plates 21, 22, 23, 24 to give the frame a generally rectangular outline as viewed in plan.

Frame 20 is supported in an elevated position by columns, such as those indicated at 30, 32 in FIG. 3 to which the frame is secured.

A plurality of elongated rollers 36, all having the same diameter, are journaled for rotation about substantially horizontal axes adjacent their opposite sets of ends on sideplates 26, 28, respectively. The rollers are parallel and laterally spaced apart and are positioned with their upper surfaces lying within a common substantially horizontal plane.

Referring to FIG. 2, a majority of rollers 36 have sprockets 40 secured thereto adjacent their top ends in this figure. Sprockets on adjacent rollers are offset from one another to prevent interference therebetween. One roller adjacent the left end of the apparatus and one roller adjacent the right end of the apparatus in FIG. 2 each have a pair of side-by-side sprockets 40 secured thereto. A pair of drive chains, shown in dashed outline and indicated generally at 42, are trained over sprockets 40 on the rollers and around a pair of idler sprockets 44 journaled beneath rollers 40 (see FIG. 3).

The roller 36 adjacent the right end of the apparatus in FIG. 2 which has a pair of sprockets 40 secured adjacent one of its ends has another sprocket 46 secured thereto adjacent its other end. A drive chain 48 trained over sprocket 46 drivingly connects this roller to a sprocket secured to the output shaft of an electric motor 50. Operation of motor 50 causes the rollers 36 which carry sprockets to rotate under power about their axes of rotation, whereby a load placed on the rollers is moved therealong in the direction of arrow 13. Rollers 36 and motor 50 are referred to collectively herein as a conveyor, or conveyor means, designated generally at 37.

An upright plate 52, having a planar surface 52a, is mounted adjacent the upper side of the apparatus in FIGS. 1 and 2 and at the right side of the apparatus in FIG. 3. The plate is mounted on a pair of upright columns 53 through multiple studbolts 54 secured to and projecting outwardly from plate 52 and through columns 53. As is seen in FIGS. 2 and 3, nuts 55 are screwed onto bolts 54 on opposite sides of columns 53 providing for infinite adjustment of the position of plate 52 and for locking the plate in a desired position. The plate is positioned with its surface 52a aligned with datum line 18 and extending parallel to the travel path for a load. Plate 52 has a length M measured along a line paralleling the path for a load which is greater than the length L of a load 12.

Figure 5:
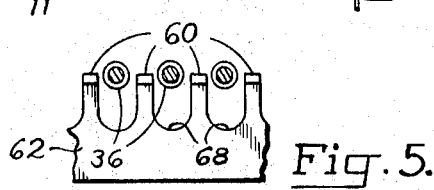
FIG. 5 is a cross-sectional view taken generally along the line 5—5 in FIG. 2.
Figure 4:
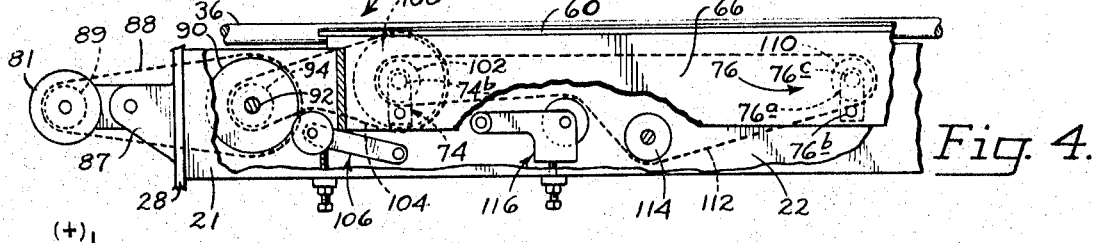
FIG. 4 is a cross-sectional view taken generally along the line 4—4 in FIG. 2.

Shifting means for shifting a load laterally of the path along which it is carried by the conveyor is indicated generally at 56 in FIGS. 2, 3 and 4. The shifting means includes a plurality of elongated, substantially parallel, and laterally spaced rails 60. The rails are mounted on a common frame formed by a pair of elongated, parallel, spaced-apart sideplates 62, 64 to which are secured opposite sets of ends of a plurality of elongated, parallel, spaced-apart connecting plates, such as those indicated at 66 in FIGS. 2, 3 and 4 underlying rails 60. Each of rails 60 is secured to the top of a connecting plate 66. Rails 60 are disposed with their upper surfaces lying within a common substantially horizontal plane and with each rail between a pair of adjacent ones of rollers 36 (see FIGS. 2 and 5). Side rails 62, 64 each have semicircular sections of material removed from their upper edges in the regions between rails 60, as is shown at 68 for plate 62 in FIG. 5. The rails 60, sideplates 62, 64 and connecting plates 66 are referred to collectively herein as a shifter.

The shifter is mounted within frame 20 of the apparatus through a pair of spaced-apart cranks, or swing arms, 74, 76 adjacent one end of the apparatus and another pair of spaced-apart cranks, or swing arms, 78, 80 adjacent the other end of the apparatus. Cranks 74, 76, 78, 80 are all similarly constructed and mounted. Therefore, only crank 76 will be described in detail.

Referring to FIGS. 2 and 4, crank 76 includes an elongated plate 76a. An elongated shaft, or pin, 76b is secured at one of its ends adjacent one end of plate 76a and projects normally outwardly from one face of the plate, while another elongated shaft, or pin, 76c is secured at one of its ends adjacent the other end of plate 76a and projects normally outwardly from the opposite face of plate 76a.

As is seen in FIG. 2, the crank is mounted with plate 76a on the right side of plate 21 in the figure. Shaft 76b extends through plate 21 in to plate 22, and is journaled on such plates for rotation about a horizontal axis paralleling the path along which a load may be moved on the conveyor. Shaft 76c extends through and is journaled on a plate 66 of the shifter. The crank is thus mounted for swinging movement about the axis of shaft 76b, with shaft 76c being swung in a circular path.

The cranks are driven by drive means, including a motor 81 and substantially similar sprocket and drive chain combinations indicated generally at 82a, 82b at opposite ends of the apparatus. Since the combinations are similar, only that indicated at 82a at the left end of the apparatus in FIG. 2 and shown in elevation in FIG. 4 will be described in detail.

Motor 81 is mounted on a cantilever support 87 projecting laterally outwardly from sideplate 26. A drive chain 88 drivingly connects a sprocket 89 on the output shaft of motor 81 to a sprocket 90. Sprocket 90 is keyed to one end of a drive shaft 92. Drive shaft 92 extends substantially parallel to sideplate 26 beneath rollers 36 and is journaled adjacent its opposite ends on plates 21, 23. Mounted on shaft 92 adjacent sprocket 90 is a smaller sprocket 94. A sprocket 96 similar to sprocket 94 is secured to the opposite end of drive shaft 92 to provide a power takeoff for sprocket and chain drive combination 82b adjacent the right end of the apparatus in FIG. 2.

Mounted on and keyed to shaft 74b of crank 74, corresponding to shaft 76b previously described for crank 76, are a sprocket 100 and a smaller sprocket 102. A drive chain 104 is trained over sprockets 94, 100 to provide a driving connection therebetween. A screw-adjustable chain tightener, indicated generally at 106, is mounted on plate 21 adjacent chain 104 for tightening the chain on sprockets 94, 100.

Mounted on and keyed to shaft 76b of crank 76 is a sprocket 110 having substantially the same diameter as sprocket 102. A drive chain 112 is trained over sprockets 102, 110 and over an idler sprocket 114 and the sprocket in a screw-adjustable chain tightener indicated generally at 116 mounted on plate 21.

The chain and sprocket combinations just described provide a driving connection between motor 81 and the cranks mounting the shifter. On operation of motor 81 in one direction the cranks are all rotated at the same speed and in the same direction causing the shifter to move from its lowered position, wherein the upper surfaces of rails 60 are below the upper surfaces of rails 36, in a substantially circular path as indicated by arrows 118 in FIG. 3. As the cranks are rotated the upper surfaces of rails 60 move upwardly through the spaces between roller 36 and into the region above the rollers. As the cranks continue to rotate the rails are moved along an arcuate path above the rollers toward plate 52, and then drop beneath the rollers to their lowered position.

The rails thus are adapted to lift a load such as that indicated at 120 in FIG. 3 supported on rollers 36, and move it through an arcuate path laterally toward plate 52. The initial position for the load resting on rollers 36 is indicated in solid outline in FIG. 3. As the cranks rotate, the shifter moves up to support the underside of the load and lift it from the rollers and shifts it laterally toward plate 52. The load is illustrated in phantom outline at 120a raised from the rollers and shifted a distance toward plate 52. On continued rotation of the cranks, one side of load 120 is brought into contact with surface 52a of the plate and is prevented from moving farther in that direction. Further rotation of cranks lower the load onto rollers 36, to assume the position illustrated in phantom outline at 120b.

The apparatus of the invention also includes automatic control means for operating the conveyor and shifting means in desired sequence. Included in the control means are a photocell 130, and a light source 132 which beams light toward the photocell, mounted on opposite sides of frame 20 adjacent the right end of the apparatus as seen in FIGS. 1 and 2. The photocell and light source are above the elevation of the upper surfaces of rollers 36 (see FIG. 3). Photocell 130 constitutes a load position sensor herein for detecting the presence of a load in a certain position on apparatus 16.

Referring specifically to FIG. 1, mounted adjacent opposite sides of conveyor 15 are a photocell 134 and light source 135. Source 135 beams a light toward photocell 134. Photocell 134 and its associated light source are positioned a distance N from the left end of conveyor 15 which is greater than the length L of a load. Photocell 134 is adapted to sense when a load has been moved completely off of apparatus 16.

Referring now to FIG. 3, the control means also includes a switch 136, including an actuating arm 137, mounted on frame 20 beneath a connecting plate 66 of the shifter. This plate 66 is adapted to engage arm 137. Switch 136 is closed with the shifter in its lowered position shown in FIG. 3, and opens with the shifter being moved upwardly.

Figure 6:
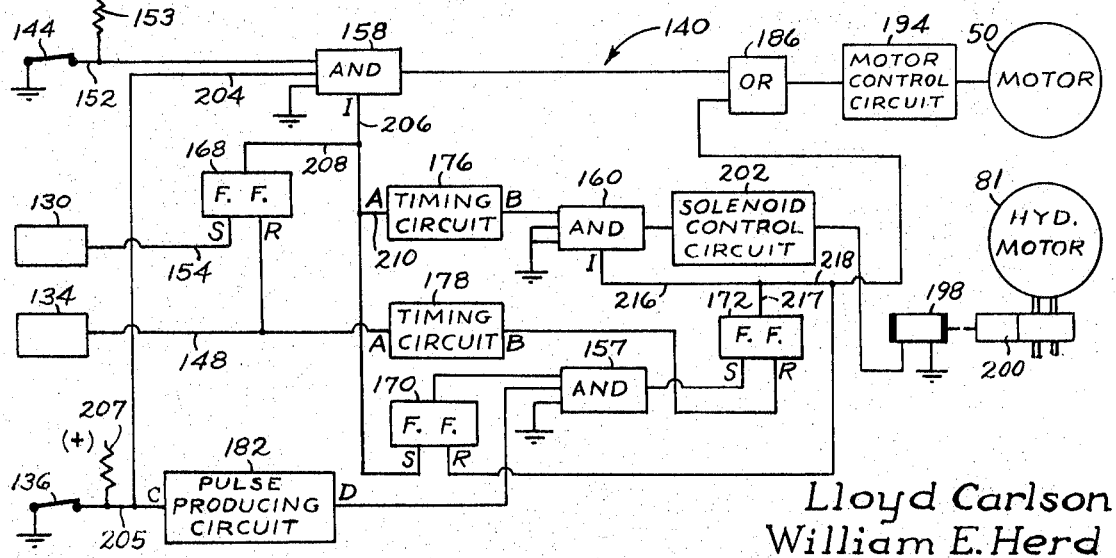
FIG. 6 is a simplified schematic diagram, partly in block form, illustrating control circuitry employed in the load-handling apparatus of FIG. 2.

Photocells 130, 134, switch 136, electric motor 50 and hydraulic motor 81 are all illustrated schematically in FIG. 6 which illustrates a control circuit, or means, 140 in the apparatus. A switch 144 is also provided in the circuit as the main "on-off" switch controlling motor 50.

Explaining briefly certain terminology which will be used in describing the control circuit, various components in circuit 140 operate in response to a pair of voltage levels. More specifically, one of these levels corresponds to ground and will be called hereinafter a "0" state. The other level corresponds to a certain positive voltage (typically about +10 volts) which will be referred to hereinafter as a "1" state. A terminal, or conductor, having one of these voltage levels on it will be referred to as being in, or having on it, either a "0" or "1" state. The "0" state may be considered to be a signal or operative, state while the "1" state may be considered to be a no signal, or nonoperative, state.

Explaining briefly how the photocells already mentioned perform, photocells 130, 134 operate similarly. More specifically, each photocell (sensor) may be thought of as having an output terminal on which it is capable of producing a signal (i.e., a "0" state). With light shining on the photocell, the same places a "1" state at its output terminal. With light blocked from shining on the photocell the output terminal thereof switches to a "0" state.

In addition to the parts already mentioned in control circuit 140, the circuit also includes: one conventional three-input AND-gate 157; two conventional three-input AND-gates with inhibit function 158, 160; three conventional flip-flops 168, 170, 172; two conventional timing circuits 176, 178; a conventional pulse-producing circuit 182; and a conventional two-input OR-gate 186.

Considering the operation of AND-gate 157, with one or more of the input terminals of this gate in a "1" state, the output of the gate is also in a "1" state. With all three input terminals in a "0" state, the output terminal is in a "0" state. The AND-gates with inhibit function operate in a similar fashion, except that with a "0" state placed on the inhibit input terminal of the gate, (the terminal designated I) the output terminal of the gate is held in a "1" state regardless of the voltage conditions existing on the other input terminals.

Referring to the flip-flops, each flip-flop includes the usual set and reset terminals, S, R, respectively, and a single output terminal. Each flip-flop functions in such a manner that the output terminal for the flip-flop normally is in a "1" state. If a "0" state is presented either momentarily or continuously at terminal S, the output of the flip-flop switches to a "0" state. Upon a "0" state thereafter being presented either momentarily or continuously at the R terminal, the output terminal returns to a "1" state.

Considering the timing circuits, each has an input terminal A and an output terminal B. Output terminal B of each timing circuit is normally in a "1" state. With a "0" state supplied at input A, output B switches to a "0" state after a preselected time interval (which may be varied), and remains in a "0" state so long as the input is in a "0" state.

Pulse-producing circuit 182 has an input terminal C and an output terminal D. The output D of circuit 182 normally is in a "1" state. When a "0" state is presented at its input C, a single, momentary pulse at the "0" state is produced on output D.

Considering OR-gate 186, a "0" state exists at its output terminal with a "0" state on either of its inputs. With a "1" state on both inputs, a "1" state exists at its output.

The output terminal of gate 186 is connected to the input terminal of a motor-control circuit, or interrupting means, 194 for motor 50. A "0" state presented at the input of circuit 194 is effective to start motor 50 to drive rolls 36.

Referring now to hydraulic motor 81 in FIG. 6, this motor is connected to and controlled by a conventional two-position control valve 200. With the valve in one position fluid under pressure is supplied to the motor causing it to operate the shifter, while with the valve shifted to its second position the motor is stopped. The valve is ganged to a solenoid 198, the energizing and deenergizing of which shifts valve 200 between its two positions.

The solenoid is operatively connected to the output terminal of a solenoid control circuit 202 whose input terminal is connected to the output of gate 160. The solenoid control circuit is so constructed that when a "0" state is supplied its input terminal by gate 160 it operates the solenoid to shift valve 200 to cause motor 81 to operate. A "1" state supplied to the input terminal of circuit 202 causes shifting of the valve to stop motor 81.

Further describing what is shown in FIG. 6, the upper input of gate 158 is connected through conductor 152 to one side of switch 144, the other side of which is grounded. Conductor 152 is connected through a resistor 153 to a suitable source of positive voltage (preferably having a voltage level of about +10 volts). The intermediate input of gate 158 is connected by a conductor 204 and a conductor 205 to one side of switch 136. The other side of switch 136 is grounded. Conductor 205 connects through a resistor 207 to the same source of voltage mentioned earlier in conjunction with resistor 153. The lower input of gate 158 is connected to ground, and thus is held in a "0" state. The output of gate 158 is connected to the upper input of gate 186. The inhibit input I of gate 158 is connected to a conductor 206. This conductor joins with conductors 208, 210 which interconnect input I of gate 158, the output terminal of flip-flop 168, input A of timing circuit 176, and input S of flip-flop 170.

Input S of flip-flop 168 is connected through a conductor 154 to the output terminal of photocell 130. Input R of flip-flop 168 is connected to a conductor 148 which interconnects the output terminal of photocell 134 and input A of timing circuit 178.

Referring now to timing circuit 176, its output B is connected to the upper input of gate 160. The intermediate and lower inputs of gate 160 are connected directly to ground, and thus are each held in a "0" state. As has been mentioned previously, the output of gate 160 is connected to the input of solenoid control circuit 202. Input I of gate 160 is connected through conductors 216, 217 to the output of flip-flop 172.

The output terminal of flip-flop 172 is also connected through conductors 217, 218 to the lower input terminal of gate 186, and through conductors 217, 218, 219 to input R of flip-flop 170. The output terminal of flip-flop 170 is connected to the upper input terminal of gate 157. The intermediate input of gate 157 is connected directly to output D of pulse-producing circuit 182. Input C of circuit 182 is connected to conductor 205. The lower input terminal of gate 157 is connected directly to ground which maintains it in a "0" state. The output terminal of gate 157 is connected to input S of flip-flop 172. Input R of flip-flop 172 is connected to output B of timing circuit 178.

Explaining the operation, as a whole, of the apparatus so far described switches 136, 144 are closed, and photocells 130, 134 are lighted. As a consequence, the output terminals of gates 158, 186 are in "0" states, and motor 50 is operating. Solenoid 198 is nonenergized, and motor 81 is stopped. Conveyor 37 in apparatus 16 thus is moving and in a condition ready to receive a load from conveyor 11.

On a load traveling on conveyor 37 moving to a position interposed between light source 132 and photocell 130, conductor 154 switches to a "0" state. This causes the output of flip-flop 168, and thus input I of gate 158, input A of circuit 176, and input S of flip-flop 170 to switch to "0" states. The "0" state at input I of gate 158 causes the output of this gate to switch to a "1" state, whereupon motor 50 and the rollers in conveyor 37 stop. In addition, the output terminal of flip-flop 170 switches to a "0" state.

After a preselected time interval, output B of circuit 176 switches to a "0" state, thereby causing the output terminal of gate 160 to switch to a "0" state. As a consequence, circuit 202 energizes solenoid 198 and motor 81 starts. The time interval provided by timing circuit 176 between the interruption of motor 50 and the starting of motor 81 is set to assure that the load, which may have considerable mass, stops on rollers 36 before motor 81 operates the shifter. Referring again to FIGS. 1 and 2, it is seen that photocell 130 and light source 132 are positioned a distance to the left of the right end of plate 52. With this positioning of the sensor which controls the interruption of motor 50, even with some movement of the load after the light is blocked from the photocell, the load's right end should stop before it reaches the right end of plate 52.

With operation of motor 81, the shifter moves upwardly and away from arm 137 of switch 136, whereby the switch opens, placing a "1" state on its output terminal and on conductor 205.

As motor 81 operates, the shifter shifts the load laterally toward and against plate 52 and then returns to its lowered position, with the load returning to the tops of rollers 36 and disposed against the plate. Switch 136 recloses.

With reclosing of switch 136, a "0" state is applied to conductor 205 and to the intermediate input terminal of gate 158. However, a "0" state still exists at input I of gate 158, and thus motor 50 does not restart at this time.

The "0" state on conductor 205 causes a single momentary "0" state pulse to be produced on the output terminal of circuit 182. This results in the production momentarily of a "0"

state on the intermediate input of gate 157 which switches its output to a "0" state. This "0" is applied to the input S of flip-flop 172, whereupon the output terminal of this flip-flop switches to a "0" state.

With this change, a "0" state voltage is applied to input I of gate 160, to the lower input terminal of gate 186, and to the R input of flip-flop 170. The "0" state at input I of gate 160 produces a "1" state at the gate's output, whereupon solenoid 198 deenergizes and motor 81 stops. The "0" state applied to input R of flip-flop 170 causes the output terminal of this flip-flop to switch to a "1" state. The "0" state applied to the lower input of gate 186 produces a "0" state at the output of this gate, whereupon motor 50 and the rollers in conveyor 37 start up again.

With resumed operation of conveyor 37 the load moves toward conveyor 15 with its top side in FIGS. 1 and 2 traveling along datum line 18. With the load traveling on conveyor 15 to a position interposed between source 135 and photocell 134, the output terminal of photocell 134 switches to a "0" state. Since the load now has been moved completely off conveyor 37, it no longer blocks light between source 132 and photocell 130, and the output terminal of the photocell is returned to a "1" state.

With a "0" state on the output terminal of photocell 134, this is applied to input R of flip-flop 168 and to input A of timing circuit 178. As a consequence, the output terminal of flip-flop 168 returns to a "1" state. A short time thereafter the output terminal of circuit 178 switches to a "0" state, causing the output terminal of flip-flop 172 to return to a "1" state. With the load on conveyor 15 moving away from photocell 134, the output terminal thereof, and that of circuit 178, return to a "1" state.

The components now have been returned to the states which they had at the initiation of the operation and are ready to provide automatic sequential control for apparatus when another load is moved thereon. The apparatus and circuitry described thus are adapted to move a load to a preselected position on a conveyor where its presence is detected by a photocell. Once the presence of the load in its proper position is detected the operation of the conveyor motor is interrupted to stop the load. Subsequently, after a time interval giving the load time to stop, the shifter motor is operated to lift the load from the conveyor, shift it laterally of the path toward an aligning plate to align it on the conveyor, after which it is lowered again to the conveyor. The shifter motor is then stopped, the conveyor motor is started, and the load is moved off the conveyor. Photocell 130 and switch 136 cooperate to assure nonoperation of conveyor 37 during the period when the shifter is operating.

Referring now to FIGS. 7 and 8, a modified form of the invention is illustrated therein. In this modified form the mechanical parts of the apparatus are substantially the same as those previously described. The modified apparatus has a similar power-driven roller conveyor, crank-operated shifter and an upright aligning plate adjacent one side of the conveyor. In this case, however, the shifter is operated by a reversible hydraulic motor 83. It also includes a photocell and a light source, 130, 132, respectively, and a switch 136 underlying the shifter which is closed with the shifter in its lowered position and opens when the shifter is raised. The modified apparatus, in addition, includes a wand-type switch indicated generally at 240. Switch 240 is mounted on the side of the apparatus opposite the aligning plate. A wand 240a in the switch projects substantially horizontally toward plate 52 and into the path along which a load may be conveyed along the apparatus. The switch 240 is so constructed that when wand 240a is in the position shown in solid outline its end nearest plate 52 is a distance "X" from the plate and the switch is open. If the wand is swung laterally of the path to the position shown in dashed outline, where the end of the wand is a distance "Y" from plate 52, the switch will close.

The switch is thus able to sense whether the side of a load facing away from the aligning plate is too closely spaced (less than distance X) to the aligning plate. This becomes important where relatively narrow loads are moved onto the apparatus, shifted against the aligning plate and in so doing are not properly centered on the conveyor. Such a narrow load, once it is shifted against the aligning plate, would not contact wand 240a and thus would not close the switch, whereas a wider load would. Switch 240, as will be described in greater detail, is operable to detect such a situation, and cause the shifter to operate in reverse to shift a narrow load to a more central position on the conveyor.

A control circuit for the modified version of the apparatus is indicated generally at 242 in FIG. 8. In FIG. 8, the output terminals of switches 144, 136 are connected to conductors 244, 246, respectively. Wand switch 240 has its output terminal connected to a conductor 250. Conductors 244, 246, 250 are connected through resistors 245, 247, 251, respectively, to a suitable source of positive voltage (having a voltage of about +10 volts). In the case of each of these switches, with a switch open its output terminal is in a "1" state, whereas, with the switch closed its output terminal is in a "0" state. Photocells 130, 134 have their output terminals connected to conductors 248, 252, respectively.

Circuit 242 includes five AND-gates 262, 264, 266, 268, 270 similar to those previously described, with gates 262, 264 in this circuit having inhibit inputs I. The circuit also includes six flip-flops 272, 274, 276, 278, 280, 282, similar to the one discussed earlier. Four timing circuits 284, 286, 288, 290, similar to those previously mentioned, are also included in the circuit. Three OR-gates 294, 296, 298 and a pair of pulse-producing circuits 302, 304 similar to those in circuit 140 are also included.

A motor control circuit 306, similar to circuit 194, is connected to motor 50 and is operable to energize the motor when a "0" state exists at its input terminal. Hydraulic motor 83 is connected conventionally to a three-position valve 310 which has a valve spool adjustable between one position wherein the motor is stopped, a second position in which fluid under pressure from a source is supplied to the motor causing it to operate in one direction, and a third position wherein fluid is supplied to produce operation of the motor in the reverse direction. A pair of solenoids 312, 314 are ganged to opposite sides of the spool in valve 310 for adjusting the position of the valve. A pair of solenoid control circuits 316, 318, similar to circuit 202, are connected to solenoids 312, 314 respectively. Each solenoid control circuit is so constructed that a "0" state existing at its input terminal energizes its associated solenoid.

Explaining now the interconnection of the component parts of circuit 242, conductor 244 is connected to the top input of gate 262. The other two input terminals of this gate are connected to ground. Inhibit input I of gate 262 is connected through a conductor 320 to a junction with conductors 321, 323, 324 which interconnect input I and the output terminal of flip-flop 272, input A of timing circuit 284 and the upper input terminal of gate 264. The output of gate 262 is connected to the upper input of gate 294. The output of gate 294 is connected directly to the input terminal of motor control circuit 306.

Conductor 248 (connected to photocell 130) is connected to input S of flip-flop 272, while input R of this flip-flop is connected through a conductor 322 to conductor 252.

The output B of timing circuit 284 is connected through a conductor 326 to input S of flip-flop 276. The output terminal of flip-flop 276 is connected through a conductor 328 to the input of solenoid control circuit 216, and also to the upper input terminal of gate 270.

Conductor 246 (connected to switch 136) is connected to input C of pulse-producing circuit 304. The output D of this circuit is connected to the intermediate input of gate 270. The lower input terminal of gate 270 is connected to ground. The output terminal of gate 270 is connected to input S of flip-flop 282. The output terminal of flip-flop 282 is connected through conductors 332, 334 to input R of flip-flop 276 and through conductors 332, 334 and a conductor 336 to the upper input terminal of gate 266 and to the intermediate input terminal of gate 264. In each of gates 264, 266, the lower input terminal is connected to ground.

Switch 240 is connected through conductor 250 to input I of gate 264, and through conductor 250 and a conductor 340 to the intermediate input terminal of gate 266. Referring still to gate 264, its output terminal is connected to input A of timing circuit 286. Output B of timing circuit 286 is connected through a conductor 342 to input S of flip-flop 278. The output terminal of flip-flop 278 is connected through a conductor 344 to the input terminal of solenoid control circuit 318, and also through conductor 344 and a conductor 346 to the upper input terminals of gates 296, 298.

Referring again to gate 266, its output terminal connects to the lower input terminal of gate 296. The output terminal of gage 296 connects through a conductor 348 to input S of flip-flop 280. The output terminal of flip-flop 280 is connected through a conductor 350 to the lower input terminal of gate 298, and to input A of timing circuit 290. The output terminal of gate 298 connects through a conductor 352 to input R of flip-flop 282.

Output B of timing circuit 290 connects through a conductor 354 to the upper input terminal of gate 268, and the lower input terminal of gate 268 is connected to ground. The output terminal of gate 268 is connected to input S of flip-flop 274, while input R of this flip-flop is connected to conductor 252 associated with photocell 134. The output terminal of flip-flop 274 is connected to input A of timing circuit 288. Output B of timing circuit 288 connects through a conductor 358 to input R of flip-flop 280, and to the lower input terminal of gate 294.

Explaining now the operation of the modified form of apparatus just described, control circuit switches 136, 144 are closed, switch 240 is open, and photocells 130, 134 are illuminated. With this situation conductors 244, 246 are in "0" states, and conductors 248, 250, 252 are in "1" states. A "0" state exists on the output terminals of gates 262, 294, and as a consequence, motor 50 operates. Solenoids 312, 314 are nonenergized and motor 83 is stopped.

With a load arriving on conveyor 37 and moving to a position interposed between light source 132 and photocell 130 the output terminal of the photocell switches to a "0" state. This switches the output of flip-flop 272 to a "0" state, which is then applied to input I of gate 262, input A of circuit 284, and the upper input of gate 264.

With the change mentioned at input I of gate 262, the output terminal of this gate 262 switches to a "1" state, whereupon motor 50 stops. With a "0" state applied to input A of timing circuit 284, and after a preselected time interval, output B of circuit 284 switches to a "0" state which is transmitted to input S of flip-flop 276. The time interval mentioned is selected to assure complete stopping of the load on conveyor 37. A "0" state applied to the upper input terminal of gate 264 at this time produces no further action. The output of flip-flop 276 switches to a "0" state and applies the same to the input terminal of circuit 316 and to the upper input terminal of gate 270. No change occurs at this time at the output terminal of gate 270. Solenoid 312 however, becomes energized and adjusts the spool in valve 310 to a position effecting operation of motor 83 in one direction. More specifically, with motor 83 operating in this direction, the shifter lifts the load from the conveyor and shifts it laterally toward the aligning plate in the apparatus.

As motor 83 moves the shifter upwardly, switch 136 opens, producing a "1" state on conductor 246. This "1" state is applied to input C of circuit 304, to input C of circuit 302, and to the intermediate input terminal of gate 268. Nothing further occurs at this time in circuit 242.

Once the shifter has returned to its lowered position, (with the load now resting on conveyor 37 and with its top side in FIG. 7 against plate 52), switch 136 recloses, returning a "0" state on conductor 246. As a consequence, inputs C of circuits 302, 304, and the intermediate input terminal of gate 268 are again each in a "0" state.

Circuit 304 applies a "0" state pulse to the intermediate input terminal of gate 270. All input terminals of gate 270 are now at a "0" state, and a "0" state pulse is produced at its output which then causes the output terminal of flip-flop 282 to switch to a "0" state. The "0" state at the output of flip-flop 282 is applied through conductors 332, 334 to input R of flip-flop 276 which resets this flip-flop whereby a "1" state is produced at its output. This causes solenoid control circuit 316 to deenergize solenoid 312, whereupon motor 83 stops.

The "0" state present at the output terminal of flip-flop 282 is applied also through conductors 332, 334, 336 to the intermediate input terminal of gate 264 and to the upper input terminal of gate 266.

If the load on the apparatus has sufficient width to close switch 240 after it has been shifted against plate 52 a "0" state will be produced on conductor 250. This produces a "0" state at input I of gate 264, whereby the output terminal of this gate will remain in a "1" state. The "0" state is also applied through conductors 250, 340 to the intermediate input terminal of gate 266. With this situation, each input terminal of gate 266 is in a "0" state which results in the output terminal of the gate switching to a "0" state.

As a result, the outputs of gate 296 and flip-flop 280 switch to "0" states. One function of the "0" state at the output of flip-flop 280 is to present a "0" state at an input of gate 298 which, in turn, presents a "0" state to input R of flip-flop 282 to reset flip-flop 282, whereby its output is returned to a "1" state. The "0" state at the output of flip-flop 280 is also applied to input A of timing circuit 290. After a time interval, a "0" state is produced at output B of circuit 290 which is applied through conductor 354 to the upper input terminal of gate 268.

All three inputs of gate 268 are now in "0" states, and thus a "0" state is produced at the output of the gate which is applied to input S of flip-flop 274. A "0" state is then produced at the output of flip-flop 274. This is applied to input A of timing circuit 288 and produces a "0" state at its output B after a preselected time interval. This "0" state is applied through conductor 358 to reset flip-flop 280, and to produce a "0" state on an input of gate 294 to effect a restarting of motor 50. With motor 50 restarted, the load is moved toward and onto conveyor 15 with its top side in FIG. 6 traveling along datum line 18.

If a load is not wide enough to close switch 240 once the load has been shifted toward and against the aligning plate, a "1" state remains on conductor 250. This state is applied to input I of gate 264 and to the intermediate input of gate 266. The output of AND-gate 266 thus is in a "1" state.

Referring now to gate 264, all three of its input terminals previously have been switched to a "0" state and with a "1" state existing at its input I, a "0" state is produced at its output. This "0" state is applied to input A of timing circuit 286. After a preselected time interval, timing circuit 286 produces a "0" state at its output B and applies the same through conductor 342 to input S of flip-flop 278. The output of flip-flop 278 switches to a "0" state, and this is applied through conductor 344 to the input of solenoid control circuit 318 which energizes solenoid 314 to shift the spool in valve 310 to a position, whereby motor 83 operates in a reverse direction.

On operation in this reverse direction motor 83 moves the shifter in a manner whereby it lifts the load from the conveyor and shifts it laterally of the path away from the aligning plate toward a more central position on conveyor 37.

The "0" state which has been produced at the output terminal of flip-flop 278 is applied through conductors 344, 346 to the upper inputs of gates 296, 298 with the output of each of these gates then switching to a "0" state. The "0" state at the output terminal of gate 298 is applied through conductor 352 to reset flip-flop 282 to a "1" state at its output terminal. The "0" state at the output terminal of gate 296 switches the output terminal of flip-flop 280 to a "0" state. This, in turn, produces, after a time interval, a "0" state at output B of timing circuit 290. The "0" state at output B of circuit 290 is applied through conductor 354 to the upper input terminal of gate 268. However, while switch 136 is open, a "1" state exists at the intermediate input terminal of gate 268, and thus a "1" state exists at its output terminal.

Once switch 136 is closed at the end of reverse shifting and with the shifter returning to its lowered position, a "0" state exists on conductor 246 which is applied to input C of pulse-producing circuit 302. A momentary "0" state pulse is produced at its output D which is applied through conductor 331 to reset flip-flop 278 to a "1" state at its output terminal, thereby producing a "1" state at the input of solenoid control circuit 318. This results in deenergizing of solenoid 314 and stopping of motor 83.

Closing of switch 136 also produces a "0" state on the intermediate input terminal of gate 268. The output terminal of gate 268 then switches to a "0" state. This "0" state is applied to input S of flip-flop 274 and its output terminal switches to a "0" state which in turn is applied to input A of timing circuit 288. After a time interval, a "0" state is produced at the output of timing circuit 288 which is applied through conductor 358 to reset flip-flop 280, and to produce a "0" state at the output terminal of gate 294 to effect starting of motor 50. It will be noted that the timing circuit 288 provides a time delay between the stopping of motor 83 and the starting of motor 50.

When the load has moved completely off conveyor 37 and onto conveyor 15, to a position interposed between source 135 and photocell 134, a "0" state is applied to conductor 252. This "0" state is applied through conductor 322 to reset the output of each of flip-flops 272, 274 to a "1" state. The "1" state output of flip-flop 272 produces a "1" state at input 1 of gate 262 whereupon the output of the gate returns to a "0" state to maintain operation of motor 50. The apparatus is then in a condition to handle another load.

It will be noted that in both modifications described herein, positioning of a load laterally to a known location on a conveyor is accomplished simply, automatically and reliably. Thus, the proposed apparatus can be used satisfactorily in situations where such lateral positioning of a load is desired. Further, because the conveyor rolls in the apparatus are stopped during operation of the shifter, the chance that packages in a multiple-package load will separate is greatly minimized.

While a preferred embodiment of the invention and a modified version of such have been presented herein, it should be understood that variations and other modifications are possible without departing from the spirit of the invention.

It is claimed and desired to secure by Letters Patent:

1. In load handling equipment including an interruptibly operable power-driven conveyor for transporting a load along a substantially horizontal path, apparatus for laterally repositioning a load on said conveyor comprising load-position-sensing interrupting means positioned adjacent and operatively connected to said conveyor operable to interrupt the operation thereof on a load arriving at a predetermined location along said path, means defining an upright surface adjacent one side of the path, power-operated shifting means for picking up a load on said conveyor and moving it toward and against said surface, and control means operatively interconnecting said interrupting means and said shifting means permitting operation of the latter only with operation of the former and with said conveyor stopped.

2. Load-handling apparatus comprising interruptibly operable power-driven conveyor means for transporting a load along a substantially horizontal path, a load position sensor for sensing the presence of a load at a predetermined location along said path, interrupting means operatively connected to said sensor and said conveyor means operable to interrupt the operation of the conveyor means on a load arriving at said predetermined location along said path, means defining an upright surface adjacent one side of said path, power-operated shifting means for picking up a load from said conveyor means and moving it toward said surface to reposition such load laterally on the conveyor means, and control means operatively connecting said interrupting means and said shifting means permitting operation of the latter only with operation of the former.

3. The apparatus of claim 2, wherein said shifting means comprises a movable shifter engageable with the base of a load, said shifter having a lowered position wherein it is disposed below the elevation of said path, and being mounted for movement upwardly and laterally of said path from its said lowered position.

4. The apparatus of claim 3, wherein the means mounting said shifter comprises a swing arm accommodating movement of the shifter in a circular course, and which further comprises a shift motor drivingly connected to said swing arm.

5. The apparatus of claim 3, which further comprises a reversible motor operable in one direction to move said shifter in a manner effective to shift a load on said conveyor means toward said surface, and in the opposite direction to produce the reverse operation.

6. The apparatus of claim 3, wherein said conveyor means comprises a plurality of spaced, substantially horizontal, parallel elongated rollers, and said shifter comprises multiple elongated spaced rails having horizontal upper surfaces substantially paralleling said rollers and movable into the spaces therebetween, said rails being so mounted that their upper surfaces are maintained substantially horizontal throughout movement upwardly and laterally of said path.

7. The apparatus of claim 2, wherein said conveyor means includes an interruptible motor, said interrupting means comprises a motor control circuit placeable in one operating condition effecting operation of said motor and in another operating condition inhibiting such operation, and said load position sensor is operatively connected to said motor control circuit and is effective to place said motor control circuit in its said other operating condition on sensing a load in said predetermined position.

8. The apparatus of claim 7, wherein said shifting means includes a shift motor, and said control means further comprises a second motor control circuit operatively connected to said shift motor and to said sensor, said second motor control circuit having one operating condition inhibiting operation of said shift motor, and being placeable in another operating condition with said sensor sensing a load in said certain position effecting operation of said shift motor.

9. The apparatus of claim 8, wherein said sensor and said second motor control circuit are interconnected through timing means which inhibits placement of the second motor control circuit in its said other operating position until the elapse of a predetermined time interval after said sensor senses a load in said certain position.

10. The apparatus of claim 8, wherein said shift motor is reversible, being operable in reverse to shift a load laterally on said conveyor means away from said surface, said second motor control circuit is placeable in a third operating condition wherein it effects operation of said shift motor in reverse, and said control means further comprises another load position sensor adjacent said conveyor means and operatively connected to said second motor control circuit, said other sensor being operable to sense the position on the conveyor means of the upright side of a load facing away from said surface with the load shifted toward said surface, and on sensing such a side lying within a certain distance from said surface, to cause said second motor control circuit to be placed in its said third operating condition after the load has been shifted toward said surface.

11. The apparatus of claim 2, wherein said upright surface is substantially planar and parallels said path.

12. Load-handling apparatus comprising an interruptibly operable power-driven conveyor for transporting a load along a substantially horizontal path, a load position sensor for sensing the presence of a load at a predetermined location along said path, interrupting means operatively connected to said sensor and said conveyor operable to interrupt the operation of the conveyor on a load arriving at said predetermined location along said path, means defining an upright surface adjacent one side of the path, power-operated shifting means for shifting a load laterally of said path and against said upright surface with the load maintained in substantially the same orientation relative to the conveyor throughout such shifting operation, and control means operatively connecting said interrupting means and said shifting means permitting operation of the latter only with the operation of the former.

13. The apparatus of claim 12, wherein said shifting means comprises a movable shifter engageable with the base of a load, said shifter having a lowered position wherein it is disposed below the elevation of said path, and being mounted for movement upwardly and laterally of said path from its said lowered position.

14. The apparatus of claim 13, wherein the means mounting said shifter comprises a swing arm accommodating movement of the shifter in a circular course, and which further comprises a shift motor drivingly connected to said swing arm.

15. The apparatus of claim 13, wherein said conveyor comprises a plurality of spaced substantially horizontal parallel rollers, and said shifter comprises multiple elongated spaced rails having substantially horizontal upper surfaces paralleling said rollers and movable into spaces therebetween, said rails being so mounted that their upper surfaces are maintained substantially horizontal throughout movement upwardly and laterally of the path.

16. The apparatus of claim 12, wherein said upright surface is substantially planar and parallels said path.

17. The apparatus of claim 12, wherein said conveyor includes an interruptible motor, said interrupting means comprises a motor control circuit placeable in one operating condition effecting operation of said motor and in another operating condition inhibiting such operation, and said load position sensor is operatively connected to said motor control circuit and is effective to place said motor control circuit in its said other operating condition on sensing a load in said predetermined position.

18. The apparatus of claim 17, wherein said shifting means includes a shift motor, and said control means further comprises a second motor control circuit operatively connected to said shift motor and to said sensor, said second motor control circuit having one operating condition inhibiting operation of said shift motor, and being placeable in another operating condition with said sensor sensing a load in said certain position effecting operation of said shift motor.

19. The apparatus of claim 18, wherein said sensor and said second motor control circuit are interconnected through timing means which inhibits placement of the second motor control circuit in its said other operating position until the elapse of a predetermined time interval after said sensor senses a load in said certain position.

20. Load-handling apparatus comprising an interruptibly operable power-driven conveyor for transporting a load along a substantially horizontal path, a load position sensor for sensing the presence of a load at a predetermined location along said path, interrupting means operatively connected to said sensor and said conveyor operable to interrupt the operating of the conveyor on a load arriving at said predetermined location along said path, means defining an upright surface adjacent one side of said path, and reversible power-operated shifting means for shifting a load laterally of said path toward and against said surface and subsequently shifting such load laterally of said path a predetermined distance away from said surface.

21. The apparatus of claim 20, wherein said shifting means comprises a movable shifter engageable with the base of a load, said shifter having a lowered position wherein it is disposed below the elevation of said path and being mounted for movement upwardly and laterally of said path from its said lowered position.

22. The apparatus of claim 21, which further comprises a reversible motor operable in one direction to move said shifter in a manner effective to shift the load on said conveyor toward said surface and in the opposite direction to produce the reverse operation.

23. The apparatus of claim 20, wherein said conveyor includes an interruptible motor, said interrupting means comprises a motor control circuit placeable in one operating condition effecting operating of said motor and in another operating condition inhibiting such operation, and said load position sensor is operatively connected to said motor control circuit and is effective to place said motor control circuit in its said other operating condition on sensing a load in said predetermined position.

24. The apparatus of claim 23, wherein said shifting means includes a shift motor operable to effect shifting of a load toward said surface and a second motor control circuit operatively connected to said shift motor and to said sensor, said second motor control circuit having one operating condition inhibiting operation of said shift motor, and being placeable in another operating condition with said sensor sensing a load in said predetermined position effecting operation of said shift motor.

25. The apparatus of claim 24, wherein said sensor and said second motor control circuit are interconnected through timing means which inhibits placement of the second motor control circuit in its said other operating position until the elapse of a predetermined time interval after said sensor senses a load in said certain position.

26. The apparatus of claim 24, wherein said shift motor is reversible, being operable in reverse to shift a load laterally on said conveyor means away from said surface, said second motor control circuit is placeable in a third operating condition wherein it effects operation of said shift motor in reverse, and said control means further comprises another load position sensor adjacent said conveyor and operatively connected to said second motor control circuit, said other sensor being operable to sense the position on the conveyor of an upright side of a load facing away from said surface with the load shifted toward said surface, and on sensing such a side lying within a certain distance from said surface, to cause said second motor control circuit to be placed in its said third operating condition after the load has been shifted toward said surface.

* * * * *